(12) United States Patent
Oda et al.

(10) Patent No.: US 7,114,396 B2
(45) Date of Patent: Oct. 3, 2006

(54) PRESSURE SENSOR

(75) Inventors: Teruo Oda, Gamagori (JP); Yasuo Shibata, Toyota (JP)

(73) Assignee: Denso Corporation, Kariya (JP)

( * ) Notice: Subject to any disclaimer, the term of this patent is extended or adjusted under 35 U.S.C. 154(b) by 34 days.

(21) Appl. No.: 11/070,278

(22) Filed: Mar. 3, 2005

(65) Prior Publication Data
US 2005/0193826 A1 Sep. 8, 2005

(30) Foreign Application Priority Data
Mar. 3, 2004 (JP) ............................. 2004-058514
Mar. 3, 2004 (JP) ............................. 2004-058515

(51) Int. Cl.
*G01L 7/08* (2006.01)
(52) U.S. Cl. ............................. 73/715; 73/753; 73/756
(58) Field of Classification Search ........... 73/700–756
See application file for complete search history.

(56) References Cited

U.S. PATENT DOCUMENTS 5,024,294 A * 6/1991 Van Fossen et al. ........ 184/108
5,115,676 A * 5/1992 Lee ............................. 73/706
5,219,041 A * 6/1993 Greve ........................ 184/108
5,279,163 A * 1/1994 D'Antonio et al. ........... 73/728
5,463,904 A * 11/1995 Kalinoski ................ 73/861.24

FOREIGN PATENT DOCUMENTS

JP            A-5-34231         9/1993

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

A pressure sensor has a sensing unit and a pressure transmitting rod housed in a case, and a pressure receiving diaphragm. The case has a sensing unit housing portion and a pipe portion that extends from the sensing unit housing portion in a form of a pipe. The pipe portion includes an inner pipe and an outer pipe. The inner pipe is arranged inside the outer pipe and fixed to the outer pipe. The pipe portion has the first end located adjacent to the sensing unit and the second end away from the sensing unit. The inner pipe is projected from the outer pipe at the second end of the pipe portion. The pressure receiving diaphragm is welded to the inner pipe at the second end of the pipe portion such that it covers an opening of the inner pipe. The pressure transmitting rod is arranged inside the case such that its first end and second end are located on the sensing unit side and the pressure receiving diaphragm side, respectively. Pressure received by the pressure sensing diaphragm is transmitted to the sensing unit via the pressure transmitting rod.

10 Claims, 6 Drawing Sheets

PRESSURE SENSOR

CROSS REFERENCE TO RELATED APPLICATION

This application is based on and incorporates herein by reference Japanese Patent Applications No. 2004-58514 and No. 2004-58515 both filed on Mar. 3, 2004.

FIELD OF THE INVENTION

The present invention relates to a pressure sensor.

BACKGROUND OF THE INVENTION

A pressure sensor having a sensing unit and a pressure transmitting rod both housed in a case is proposed in JP-A-5-34241. The sensing unit, such as a strain gage, outputs signals according to pressure levels. The case has a pipe portion that extends from a sensing unit housing portion and an opening at an end of the pipe portion. A pressure receiving diaphragm is fixed to the end of the pipe portion by welding such that it covers the opening. The pressure transmitting rod is arranged such that its first end and second end are located on the sensing unit side and the pressure receiving diaphragm side, respectively. Pressure applied to the pressure receiving diaphragm is transmitted to the sensing unit via the pressure transmitting rod.

The pressure sensor is fixed to a subject, such as an engine block, by inserting the pipe portion into a mounting hole provided in the subject until the end of the pipe portion touches an inner surface of the subject via the diaphragm. The opening of the pipe portion is sealed with the diaphragm. The contact between the pipe portion and the inner surface of the subject creates stress, namely, a force is applied to the pipe portion in its longitudinal direction and the pipe portion is pushed toward the sensing unit. The stress is also applied to the pressure transmitting rod. As a result, the pressure transmitting rod is pressed against the sensing unit and an abnormal signal is outputted from the pressure sensor.

SUMMARY OF THE INVENTION

The present invention therefore has an objective to provide a pressure sensor that is less likely to be affected by a force applied when it is mounted to a subject. A pressure sensor of the present invention includes a pressure receiving diaphragm, a pressure transmitting rod, a sensing unit, and a case. Pressure received by the pressure receiving diaphragm is transmitted to the sensing unit via the pressure transmitting rod and the sensing unit outputs signals according to pressure levels.

The case houses the sensing unit and the pressure transmitting rod. The pressure transmitting rod is arranged in the case such that its first end sits on a sensing unit side and its second end sits on a pressure receiving diaphragm side. The case has a sensing unit housing portion that houses a sensing unit and a pipe portion that extends from the sensing unit housing portion in the form of a pipe. The pipe portion has a first end located adjacent to the sensing unit housing portion and a second end located away from the sensing unit housing portion. The pipe portion is constructed of an inner pipe and an outer pipe. The inner pipe is arranged inside the outer pipe and fixed to the outer pipe. The second end of the pipe portion has an opening and the pressure receiving diaphragm is welded to the second end of the pipe portion such that it covers the opening.

The pipe portion is inserted into a mounting hole of a subject, such as an engine block, to which the pressure sensor is fixed until the second end of the pipe portion is brought into contact with an inner surface of the subject. An opening of the outer pipe is sealed with the inner surface of the subject. A force may be applied to the outer pipe in its longitudinal direction when the pipe portion is inserted into the mounting hole. Such a force, however, is less likely to be applied to the inner pipe because the end of the inner pipe is not brought into contact with the inner surface of the subject at the second end of the pipe portion. Thus, the pressure transmitting rod housed in the inner pipe is less likely to be affected by the force and a force is less likely to be applied to the sensing unit via the pressure transmitting rod when the pipe portion is inserted in the mounting hole.

An assembly method of a pressure sensor includes fixing the sensing unit to the first case, welding the pressure receiving diaphragm to the second case, assembling the first case and the second case together such that the pressure transmitting rod is housed in the first and the second cases. The case is formed as one unit by assembling the first case and the second case together. Prior to the assembly of the first case and the second case, the sensing unit is fixed to the first case and the pressure receiving diaphragm is welded to the second case.

The first case and the second case are assembled into one unit in which the pressure transmitting rod is housed such that the first end and the second end of the pressure transmitting rod are pressed against the sensing unit and the pressure receiving diaphragm, respectively. Namely, the loads are applied to the sensing unit and the pressure receiving diaphragm by the pressure transmitting rod through its first and second ends, respectively.

The pressure receiving diaphragm is welded in advance to the assembling of the first case and the second case. Namely, a process for welding the pressure receiving diaphragm to the case and a process for applying the load to the pressure receiving diaphragm are separately performed. Thus, the pressure receiving diaphragm is thermally stable and no thermal deformation due to the application of the load will occur in the pressure receiving diaphragm. In the welding process, the pressure receiving diaphragm is less likely to be thermally deformed due to the load applied to the pressure receiving diaphragm.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
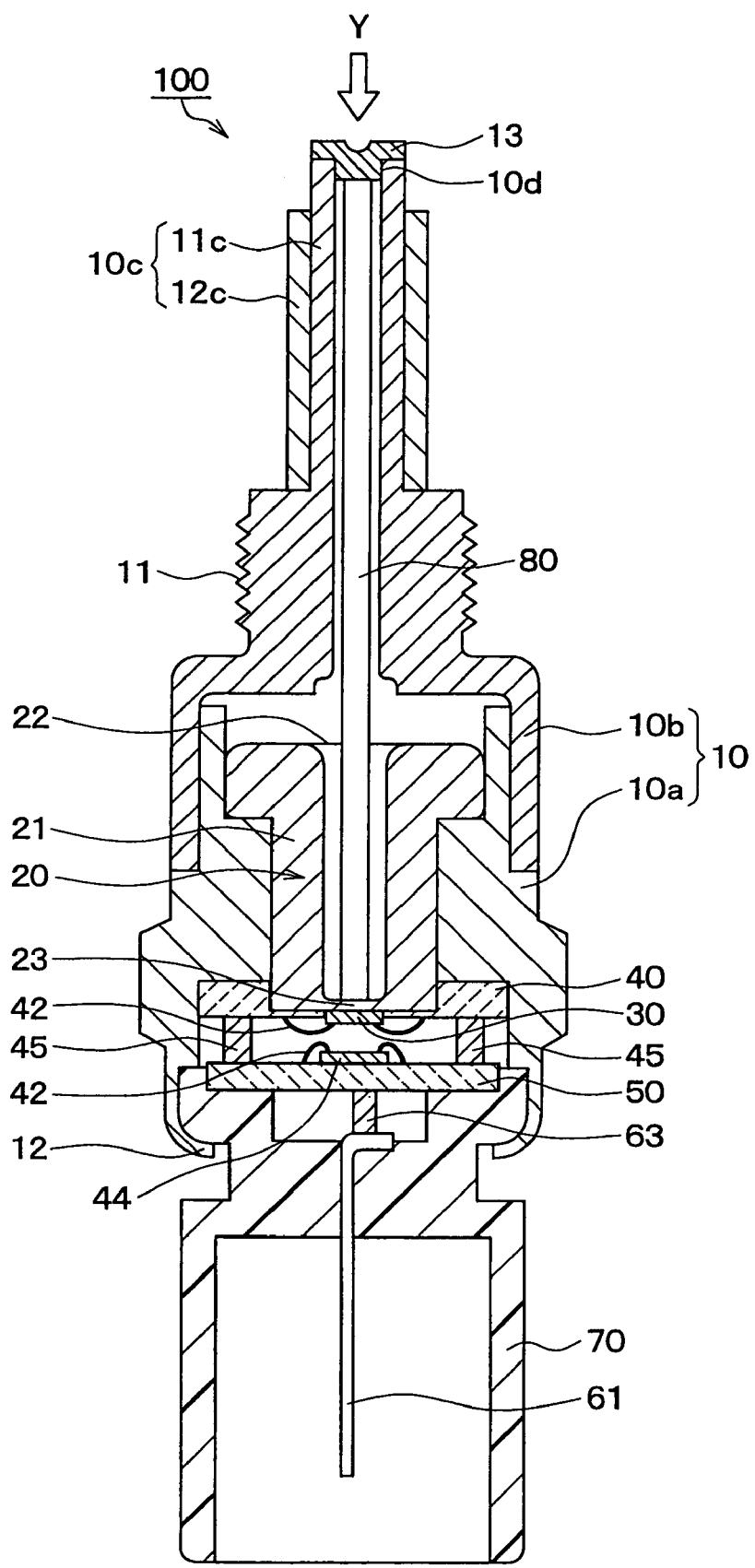
FIG. 1 is a cross-sectional view of a pressure sensor according to the first embodiment of the present invention.

The preferred embodiments of the present invention will be explained with reference to the accompanying drawings. In the drawings, the same numerals are used for the same components and devices.

Figure 6:
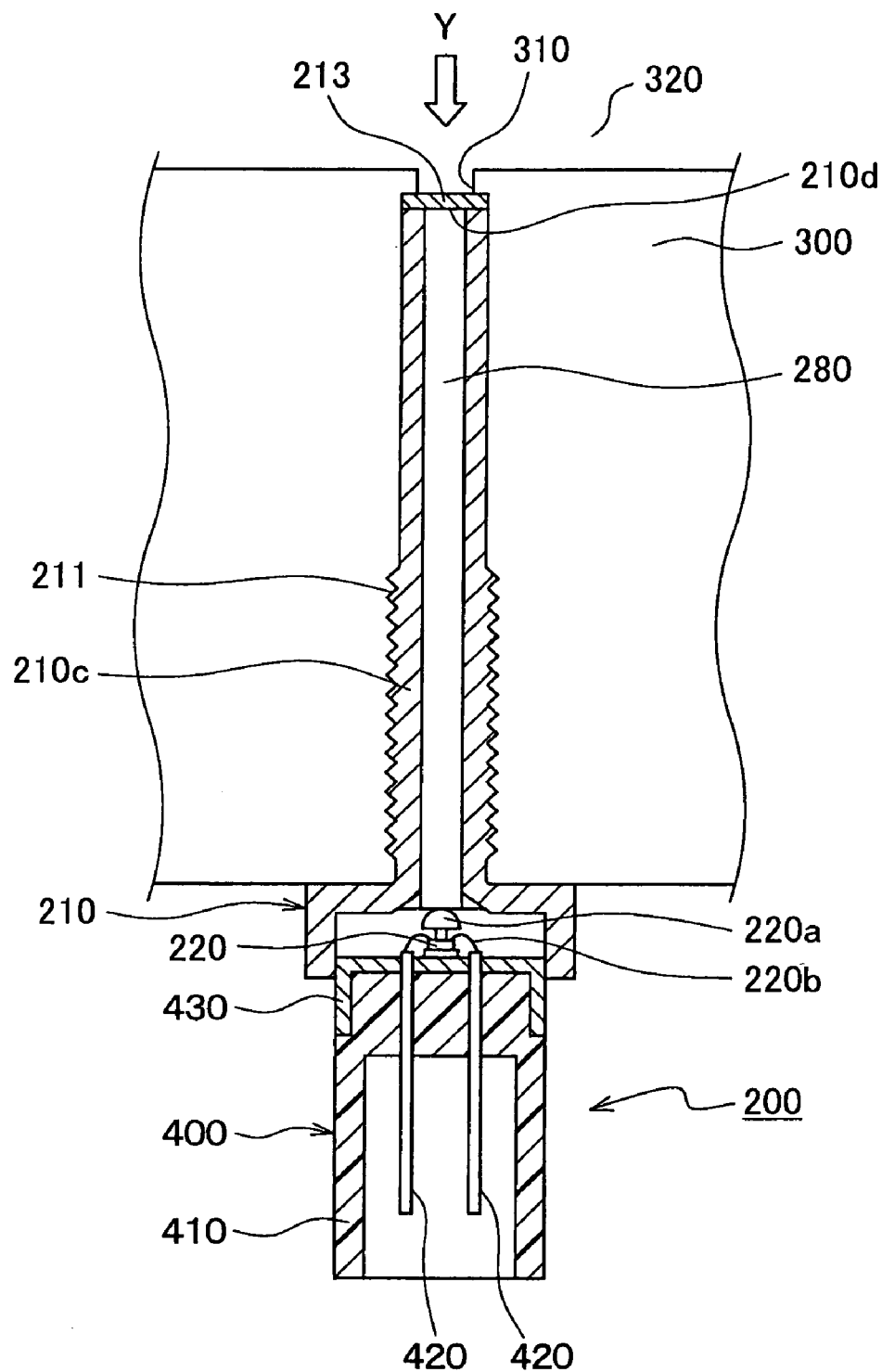
FIG. 6 is a cross-sectional view of a trail model of a pressure sensor according to a related art.

A trial model of a pressure sensor according to a related art is shown in FIG. 6. This pressure sensor is built to examine the abnormal output problem regarding the related art. A pressure sensor 200 is mounted to an engine block 300 for sensing internal pressure of a combustion chamber 320 of the engine block 300. The pressure sensor 200 includes a case 210, a sensing unit 220, a pressure transmitting rod 280, and a connector 400. The case 210 is made of metal and in a form mountable to the engine block 300. The case 210 has a sensing unit housing portion 210a that houses the sensing unit 220 and a pipe portion 210c that houses the pressure transmitting rod 280. The sensing unit 220 outputs signals according to pressure levels. The pressure transmitting rod 280 transmits pressure to the sensing device 220. The connector 400 transmits the signals outputted form the sensing unit 220 to an external device.

The pipe portion 210c extends from the sensing unit housing portion 210a. A pressure receiving diaphragm 213 is welded to an opening 210d of the case 210 located at the second end of the pipe portion 210c away from the sensing unit 220 such that it coves the opening 210d. The first end of the pipe portion 210c adjacent to the sensing unit 220 is connected to the sensing unit housing portion 210a. The pipe portion 210c is inserted into a mounting hole 310 of the engine block 300. The end of the pipe portion 210c is fixed to inner wall of the engine block 300 via the pressure receiving diaphragm 213 and sealed. A part of outer periphery of the pipe portion 210c is threaded (thread portion 211) and screwed in the mounting hole 310.

The pressure transmitting rod 280 is arranged in the pipe portion 210c such that its first end and second ends sit on the sensing unit side and the pressure receiving diaphragm side, respectively. A pressure transmitted from the combustion chamber 320 to the pressure receiving diaphragm 213 and to the sensing unit 220 via the pressure transmitting rod 280. A signal indicating a level of the pressure is outputted from the sensing unit 220. The sensing unit 220 may be constructed by forming a gage resistor on a semiconductor substrate. A dome-shaped member 220a made of steel, such as carbon steel, is attached to the sensing unit 220. A load is applied to the sensing unit 220 by the pressure transmitting rod 80 via the dome-shaped member 220a.

The connector 400 is constructed of a connector plug 410, terminals 420, and a plate 430. The connector plug 410 is made of polyphenylene sulfide (PPS). The terminals 420 and the plate 430 are integrated to the connector plug 410 by insert molding. The connector 400 is electrically connected to an external device for inputting pressure signals to the external device.

The sensing unit 220 is electrically connected with the terminals 420 by connecting gold or aluminum bonding wires 220b between the sensing unit 220 and ends of the terminals 420. The connector 400 is connected with the case 210 by welding the plate 430 to the case 210 or by swaging the plate 430 to the case 210. The pressure sensor 200 is screwed into the engine block 300. The end of the pipe portion 210c is attached to the inner surface of the engine block 300 and sealed.

The pressure transmitting rod 280 is pushed in the longitudinal direction when a pressure is applied to the pressure receiving diaphragm 213. The pressure is applied to the sensing unit 220 via the pressure transmitting rod 280 and the dome-shaped member 220a. The sensing unit 220 outputs a signal indicating the pressure level to the external device via the bonding wire 220b and the terminals 420. As a result, the pressure in the combustion chamber is detected.

A force is applied to the pipe portion 210 in the longitudinal direction because the pipe portion 210c has contact with the inner surface of the engine block 300 via the pressure receiving diaphragm 213. The force is also applied to the pressure transmitting rod 280 housed in the pipe portion 210c. As a result, the force is transmitted to the sensing unit 220 and an abnormal signal is outputted from the sensing unit 220. Namely, pressure in the combustion chamber 320 cannot be properly detected.

First Embodiment

Figure 2:
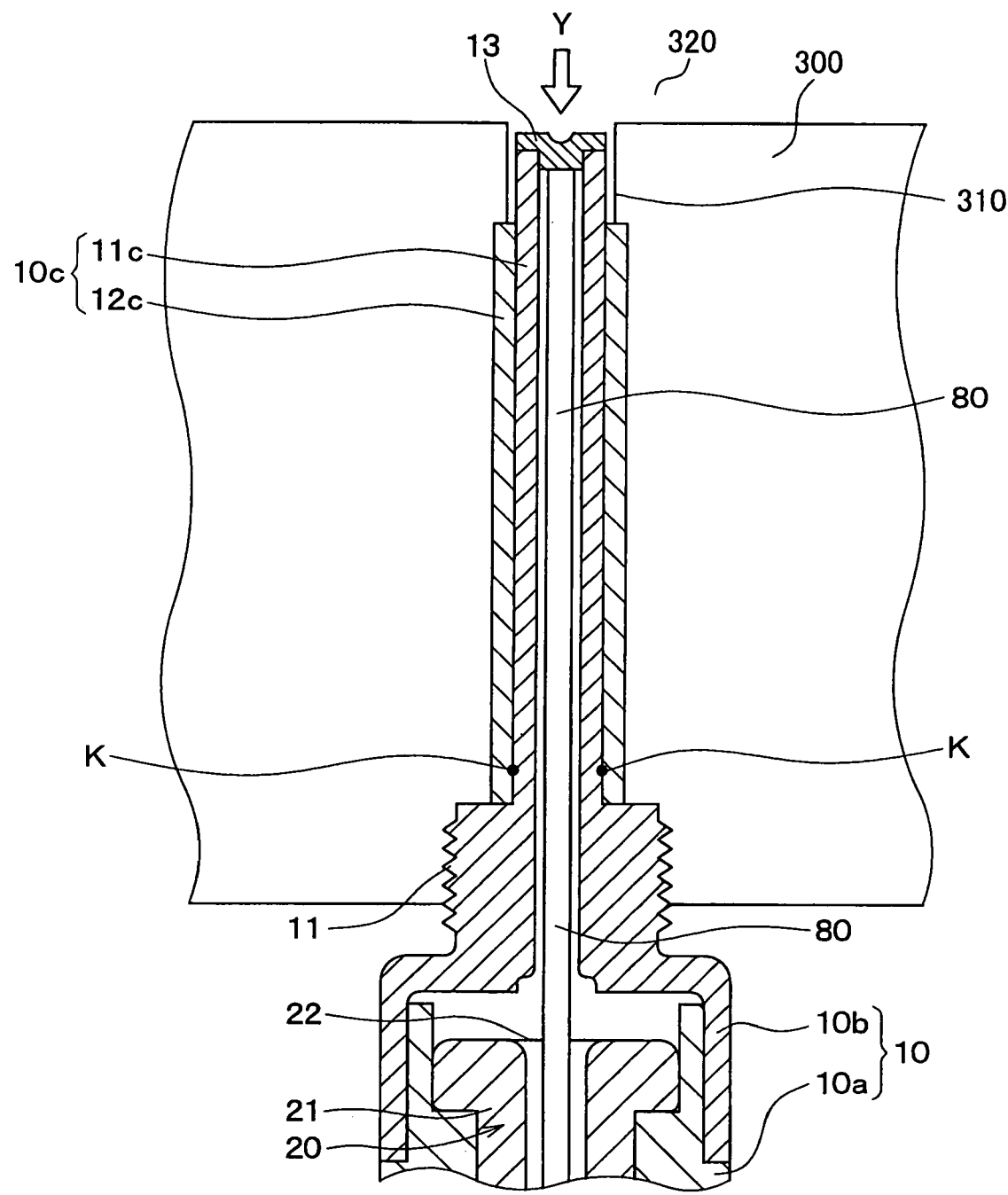
FIG. 2 is a cross-sectional view of the pressure sensor mounted to an engine block according to the first embodiment.

Referring to FIGS. 1 and 2, a pressure sensor 100 is screwed into an engine block 300 for detecting pressure in a combustion chamber 320 of the engine block 300. The pressure sensor 100 includes a case 10, a pressure receiving diaphragm 13, a pressure transmitting rod 80, and a sensing unit 20. The case 10 has the first case 10a and the second case 10b. The first case 10a is formed in about a cylindrical shape. The second case 10b has a pipe portion 10c that is formed in a pipe shape with a diameter smaller than the first case 10a. The pipe portion 10c is drawn exaggeratedly short for purposes of illustration in FIGS. 1 and 2.

The first case 10a and the second case 10b are made of metal, such as stainless steel, and worked by cutting or cold forging. The first case 10a and the second case 10b are engaged by press-fitting the first case 10a to an expanded portion of the second case 10b. The first case 10 and the second case 10b can be fixed together by welding, bonding, or with screws. A part of the outer periphery of the pipe portion 10c is threaded to form a screw portion 11 so that the pipe portion 10c can be screwed into the engine block 300. The pipe portion 10c is inserted into a mounting hole 320 of the engine block 300 and screwed to the engine block 300 via the screw portion 11.

The sensing unit 20 is housed in the first case 10a. The sensing unit 20 outputs signals according to pressure levels. The sensing unit 20 includes a metal stem 21, a diaphragm 23, and a strain gage 30. The metal stem 21 has an opening 22 at one end and the diaphragm 23 at the other end. It is formed in a cylindrical shape having a hollow in the middle between the ends. The strain gage 30 is fixed to a surface of the diaphragm 23 by glass welding. The metal stem 21 is press-fitted in a hollow of the first case 10a and fixed. It may be fixed to the case 10 with screws. The metal stem 21 is arranged such that the opening 22 sits adjacent to an end of the first case 10a, which is connected to the second case 10b, and the diaphragm 23 sits adjacent to an end of the first case 10a, in which the sensing unit 20 is housed.

The strain gage 30 is a silicon semiconductor chip in which a bridge circuit is formed. A resistance in the circuit varies according to a deformation of the diaphragm 23 when pressure is applied. The strain gage 30 converts the variation in resistance to an electrical signal and outputs the electrical signal. The metal stem 21, the diaphragm 23, and the strain gage 30 affect basic performance of the pressure sensor 100.

The materials adequate for the metal stem 21 require high rigidity and low thermal expansion because the metal stem 21 is put under very high pressure and the strain gage 30 is fixed to the metal stem 21 with low-melting glass. Such materials include iron (Fe), nickel (Ni), cobalt (Co), or materials containing Fe, Ni as main components and titanium (Ti), niobium (Nb), aluminum (Al) as precipitation hardening components or Ti and Nb are added to Fe, Ni. The metal stem 21 is formed by pressing, cutting or cold forging.

The first ceramic circuit board 40 is arranged around the diaphragm 23 inside the case 10. The strain gage 30 and the first circuit board 40 are electrically connected with each other via aluminum bonding wires 42. The second ceramic circuit board 50 is arranged such that its first surface opposes the first circuit board 40. An IC chip 44 is mounted on the first surface of the second circuit board 50. More specifically, the first surface of the first circuit board 40 on which the bonding wires 42 are bonded and the first surface of the second circuit board 50 are opposes to each other.

The IC chip 44 includes circuits for amplifying and adjusting outputs of the strain gage 30. The IC chip 44 is electrically connected with the second circuit board 50 via the bonding wires 42. The first circuit board 40 and the second circuit board 50 are electrically connected with each other via springs 45. Each spring 45 is conductive elastic members and one of its ends is fixed to either the first circuit board 40 or the second circuit board 50 by brazing or soldering. The electrical connection between the first circuit board 40 and the second circuit board 50 is established when the other end of the spring 45 touches the other of the first and the second circuit board 40, 50 whichever the spring 45 is not fixed to.

A connector case 70 that is made of resin, such as polyphenylene sulfide (PPS), is fixed to the second surface of the second circuit board 50, which is provided on the opposite side to the first surface. A terminal 61 is integrally provided with the connector case 70 by insert molding and housed in the connector case 70. The terminal 61 is electrically connected with second circuit board 50 via a conductive connector 63. The conductive connector 63 can be a spring, a conductive adhesive, or anisotropic conductor pins arranged in a rubber. The connector case 70 is swaged into an end portion 12 of the first case 10a. The terminal 61 is electrically connectable to an external device including an electronic control unit (ECU) installed in a vehicle via a connecting member.

The pipe portion 10c protrudes from a sensing unit housing portion of the second case 10b in which the sensing unit 20 is housed. The pipe portion 10c has the first end located adjacent to the sensing unit housing portion and the second end located away from the sensing unit housing portion. The pressure receiving diaphragm 13 is made of metal, such as stainless steel, and welded to the second end of the pipe portion 10c such that it covers the opening 10d. The pressure transmitting rod 80 is also made of metal and arranged in the case 10 such that its first end and second end sit on the sensing unit side and the pressure receiving diaphragm side, respectively.

The pressure transmitting rod 80 is inserted into the metal stem 21 via the opening 22 from the first end until the first end touches the diaphragm 23. The pressure transmitting rod 80 is positioned such that it applies loads to the diaphragm 23 at the first end and the pressure receiving diaphragm 13 at the second end. Pressure received by the pressure receiving diaphragm 13 is transmitted to the sensing unit 20 via the pressure transmitting rod 80 and the pressure is detected.

The pipe portion 10c is formed in a double pipe structure having an inner pipe 11c and an outer pipe 12c. The inner pipe 11c is arranged inside the outer pipe 12c and fixed to the outer pipe 12c. The first end of the inner pipe 11c connects with the sensing unit housing portion of the second case 10b via the thread portion 11. The second end of the inner pipe 11c projects from the outer pipe 12c. The pressure receiving diaphragm 13 is welded to the second end of the inner pipe 11c such that it coves an opening of the inner pipe 11c.

Figure 3A:
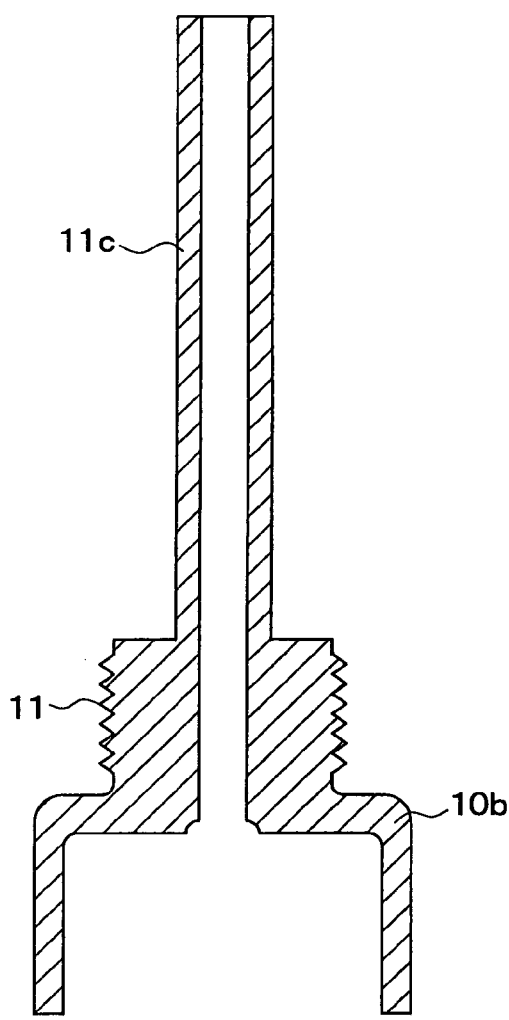
FIG. 3A is a cross-sectional view of the pressure sensor around its pipe portion according to the first embodiment.
Figure 3B:
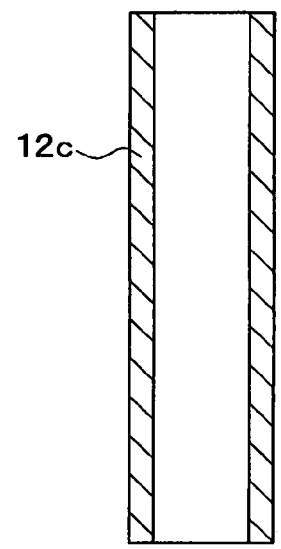
FIG. 3B is a cross-sectional view of an outer pipe included in the pipe portion according to the first embodiment.

A method for assembling the pipe portion 10c will be explained. A second case 10b only having the inner pipe 11c shown in FIG. 3A and the outer pipe 12c shown in FIG. 3B are prepared. The inner pipe 11c is inserted into the outer pipe 12c and the inner pipe 11c and the outer pipe 12c are fixed together by welding or brazing at points indicated with black dots K in FIG. 2 close to the first end of the pipe portion 10c. The pressure receiving diaphragm 13 is welded to the second end of the inner pipe 11c.

A method for assembling the pressure sensor 100 will be explained. The metal stem 21, to which the strain gage 30 is fixed, is press-fitted to the first case 10a and fixed. The first circuit board 40 is arranged around the metal stem 21 and the first circuit board 40 and the strain gage 30 are connected together via bonding wires 42. The first circuit board 40 and the second circuit board 50 on which the IC chip 44 is mounted and electrically connected with the bonding wires 42 are connected together via the springs 45.

The connecter case 70 is fitted to the first case 10a and fixed by swaging the end portion 12 of the first case 10a. The terminal 61 and the second circuit board are connected with each other with conductive connecting member 63. The sensing unit 20, the first case 10a, and the connector case 70 are assembled in one unit.

The diaphragm 13 is welded to the second end of the inner pipe 11c and the inner pipe 11c is fixed inside the outer pipe 12c by welding. The pressure transmitting rod 80 is inserted into the metal stem 21 though the opening from the first end and into the pipe portion 10c from the second end. Then, the first case 10a and the second case 10b are assembled into one unit by press-fitting. As a result, the pressure sensor 100 shown in FIG. 1 is produced.

The pressure sensor 100 is fixed to the engine block 300 by inserting the pipe portion 10c and the tread portion 11 into the mounting hole 310 of the engine block 300 and engaging the thread portion 11 to a thread portion of the engine block 300 as shown in FIG. 2. The second end of the inner pipe 11c does not touch the inner surface of the engine block 300. The second end of the outer pipe 12c is brought into contact with the inner surface of the engine block 300 at the boundary between the mounting hole 310 with a larger diameter and that with a smaller diameter and sealed. This sealing structure is easily achieved through mechanical designing with consideration of the diameters of the mounting hole 310, and the diameters and the thicknesses of the inner pipe 11c and the outer pipe 12c.

The pressure in the combustion chamber 320 is applied to the pressure receiving diaphragm 13 as indicated with a white arrow Y in FIGS. 1 and 2 and transmitted to the sensing unit 20 via the pressure transmitting rod 80. The diaphragm 23 of the metal stem 21 is deformed by the pressure and the deformation of the diaphragm 23 is converted into an electrical signal by the strain gage 30. The electric signal indicating a level of the pressure is processed by the IC chip 44 and outputted to an external device via the terminal 61.

As described above, the pressure sensor 100 has the case 10, the sensing unit 20 housed in the case 10, the pressure receiving diaphragm 13, and the pressure transmitting rod 80. The case 10 has the pipe portion 10c that has the opening 10d at its second end and the pressure receiving diaphragm 13 is welded to the second end of the pipe portion 10c such that it covers the opening 10d. The pressure transmitting rod 80 is arranged in the case 10 such that its first end sits on the sensing unit side and its second end sits on the pressure receiving diaphragm side. With this configuration, the pressure received by the pressure receiving diaphragm 13 is transmitted to the sensing unit 20 via the pressure transmitting rod 80. As a result, the pressure is detected.

The pipe portion 10c is formed in a double pipe structure having the inner pipe 11c and the outer pipe 12c. The inner pipe 11c is arranged inside the outer pipe 12c and fixed to the outer pipe 12c. The second end of the inner pipe 11c having an opening is projected from the outer pipe 12c. The pressure receiving diaphragm 13 is welded to the second end of the inner pipe 11c such that it covers the opening.

The pipe portion 10c is inserted in the mounting hole 310 such that the second end of the outer pipe 12c has contact with the inner surface of the engine block 300 and sealed. The second end of the inner pipe 11c is sealed with the pressure receiving diaphragm 13 without being attached to the inner surface. Namely, a force is less likely to be applied to the inner pipe 11c in its longitudinal direction although it may be applied to the outer pipe 12c in its longitudinal direction. As a result, a force is less likely to be applied to the pressure transmitting rod 80, which is housed in the inner pipe 11c, and the pressure transmitting rod 80 is less likely to push the sensing unit 20 when the pipe portion 10c is inserted into the mounting hole 310.

The inner pipe 11c is fixed to the outer pipe 12c near the first end of the pipe portion 10c, that is, the outer pipe 12c is fixed near the first end of the pipe portion 10c. Thus, a force that may deform the outer pipe 12 can be received in a large area of the outer pipe 12c and the force that may be applied to the inner pipe 11c in its longitudinal direction can be reduced.

The sensing unit 20 is constructed of the metal stem 21 and the strain gage 30. The metal stem 21 has the hollow in the middle, the opening 22 at its first end, and the diaphragm 23 at the second end. The strain gage 30 is mounted to the surface of the diaphragm 23. With this configuration, pressure in the combustion chamber 320 is properly detected.

Second Embodiment

Figure 4A:
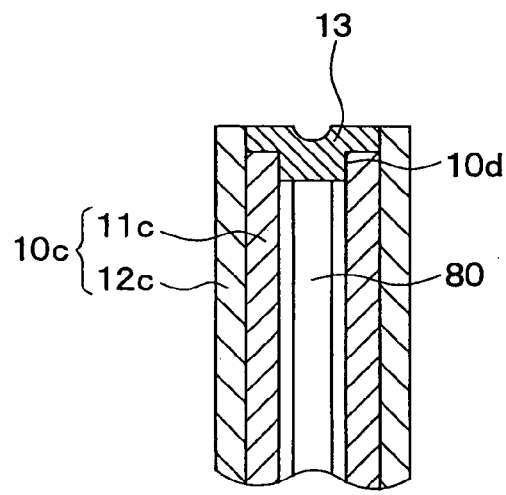
FIG. 4A is a cross-sectional partial view of a pressure sensor according to the second embodiment of the present invention.

Referring to FIG. 4A, the inner pipe 11c is arranged such that the second end of the inner pipe 11c is positioned inside the second end of the outer pipe 12c. The openings of the inner pipe 11c and the outer pipe 12c are sealed with the pressure receiving diaphragm 13 at their second ends. The second end of the outer pipe 12c is attached to the inner surface of the engine block 300 when the pipe portion 10c is inserted into the mounting hole 310 of the engine block 300. The structure of other parts is the same as the first embodiment and will not be discussed. With this configuration, the same effects as the first embodiment can be produced.

Third Embodiment

Figure 4B:
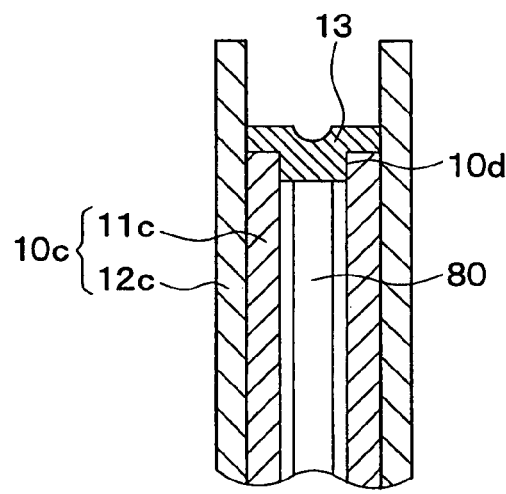
FIG. 4B is a cross-sectional partial view of a pressure sensor according to the third embodiment of the present invention.

Referring to FIG. 4B, the inner pipe 11c is arranged such that the second end of the inner pipe 11c is positioned inside the second end of the outer pipe 12c. The opening of the inner pipe 11c is sealed with the pressure receiving diaphragm 13 at its second end and the opening of the outer pipe 12c is sealed with the pressure receiving diaphragm 13 near its second end. The second end of the outer pipe 12c is attached to the inner surface of the engine block 300 when the pipe portion 10c is inserted into the mounting hole 310 of the engine block 300. The structure of other parts is the same as the first embodiment and will not be discussed. With this configuration, the same effects as the first embodiment can be produced.

Fourth Embodiment

Figure 7:
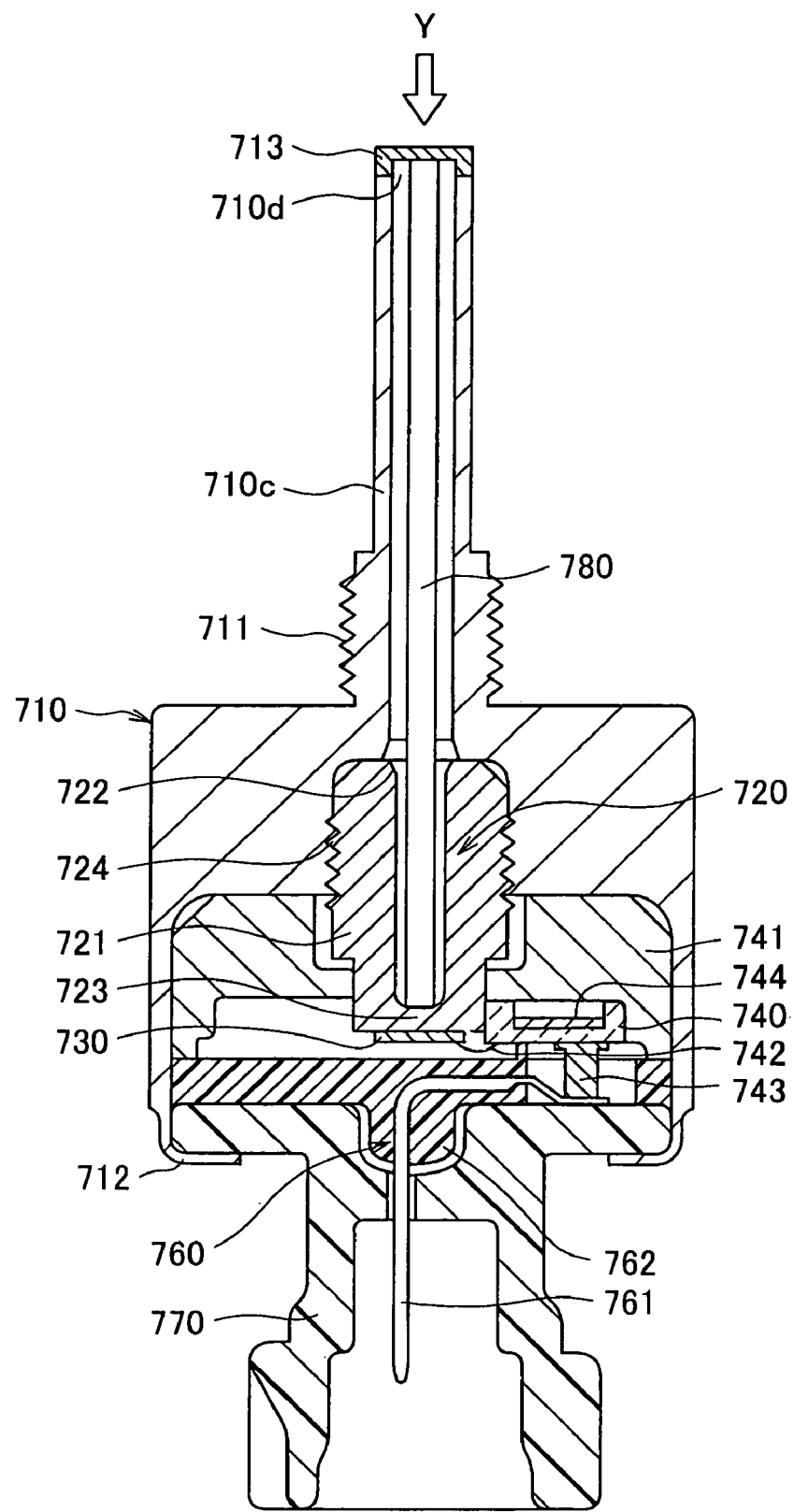
FIG. 7 is a cross-sectional view of a trail model of a pressure sensor according to a related art.

A trial model of a pressure sensor according to another related art is shown in FIG. 7. A part of an outer periphery of a metal case 710 is threaded for screwing the pressure sensor to an engine block. The threaded part is referred to as a thread portion 711. A sensing unit 720 is housed in the case 710. The sensing unit 720 includes a metal stem 721, a diaphragm 723, and a strain gage 730. The metal stem 721 has an opening 722 at one end and the diaphragm 723 at the other end. It is formed in a cylindrical shape having a hollow in the middle between the ends.

The strain gage 730 is fixed to a surface of the diaphragm 723 by glass welding. The diaphragm 723 deforms when a force related to the pressure is applied. The strain gage 730 is a semiconductor chip that converts a variation in resistance due to the deformation of the diaphragm 723 into an electrical signal and outputs the signal. A thread portion 724 is formed in a part of the outer periphery of the metal stem 721. The metal stem 721 is screwed to the case 710 with the thread portion 724.

A ceramic circuit board 740 is arranged on a side of the outer periphery of the metal stem 721. The circuit board 740 is adhered to the spacer 741. The strain gage 730 and the circuit board 740 are electrically connected with each other via bonding wires 742. A pin 743 is connected to a surface of the circuit board 740 to which the bonding wires 742 are connected for electrical connection with a terminal 760. An IC chip 744 is mounted on the opposite surface of the circuit board 740 for amplifying or adjusting outputs of the strain gage 730. The IC chip 744 is electrically connected with the pin 743 via a through hole provided in the circuit board 740.

The connecter 760 is an assembly in which a terminal 761 is assembled to a resin part 762 by insert molding. The terminal 761 and the circuit board 740 are connected to the pin 743 by laser welding. The connector 760 is housed in a resin connector case 770 and fixed by swaging an end portion 712 of the case 710 to the connector case 770. In this process, the connector case 770 is integrated to the case 710 and forms a package together with the case 710 for protecting the strain gage 730, ICs, and electrically connected parts from moisture and mechanical stress. The terminal 761 is connectable to an external device via a connecting member.

The case 710 has a pipe portion 710c that extends from a sensing unit housing portion that houses the sensing unit 720. The pipe portion 710c has an opening 710d at its end. A metal pressure receiving diaphragm 713 is welded to the end of the pipe portion 710c such that it covers the opening 710d. The pipe portion 710c houses a metal pressure transmitting rod 780. The pressure transmitting rod 780 is inserted into the metal stem 721 through the opening 722 from the first end and the first end is brought into contact with the diaphragm 723 such that a load is applied to the diaphragm 723 via the fist end.

The second end of the pressure transmitting rod 780 is brought into contact with the pressure receiving diaphragm 713 such that a load is applied to the pressure receiving diaphragm 713 via the second end. Pressure received by the pressure receiving diaphragm is transmitted to the sensing unit 720 via the pressure transmitting rod 780 and detected by the sensing unit 720.

A process for assembling the pressure sensor will be explained. The strain gage 730 is attached to the metal stem 721. The metal stem 721 is screwed to the case 710. The spacer 741 is inserted into the case 710 and connected to the circuit board 740. The strain gage 730 and the circuit board 740 are electrically connected with the bonding wires 742. The terminal 760 and the pin 743 are connected by laser welding. The connector case 770 is fitted to the case 710 and fixed by swaging the end portion 712 of the case 710 to the connector case 770.

The pressure transmitting rod 780 is inserted into the case 710 through the opening 710d and the pressure receiving diaphragm 713 is placed at the end of the pipe portion 710c such that it covers the opening 710d. The pressure receiving diaphragm 713 is welded to the end of the pipe portion 710 while a load is applied to the pressure receiving diaphragm 713 so that the diaphragm 723 is pushed by the pressure transmitting rod 780. Then, the assembly process is completed.

The pressure sensor is mountable to a subject, such as an engine block, with the thread portion 711. Pressure applied to the pressure receiving diaphragm in the direction indicated with white arrow Y is transmitted to the sensing unit 720 via the pressure transmitting rod 780. The pressure deforms the diaphragm 723 and the deformation is converted into an electrical signal by the strain gage 730. As a result, the pressure is detected.

In the assembly process, a load is applied to the pressure receiving diaphragm 713 by the pressure transmitting rod 780 during the welding of the diaphragm 713. Two main reasons why the welding is performed while a load is applied to the pressure receiving diaphragm 713 will be provided.

The first reason is that the pressure transmitting rod 780 may be separated from at least one of the pressure receiving diaphragm 713 and the diaphragm 723 if the load is not applied. This is because the pressure transmitting rod 780 may contract in response to changes in temperature according to a linear expansion coefficient.

The second reason is that the pressure receiving diaphragm 713 may be curved outward and separated from the pressure transmitting rod 780 when negative pressure is applied. The negative pressure is possibly applied when the pressure sensor is used for detecting pressure in a combustion chamber of an engine.

For the above two reasons, the pressure receiving diaphragm 713 is welded while a load is applied to maintain contact between the pressure transmitting rod 780 and the diaphragms 713 and 723. However, the pressure receiving diaphragm 713 is more likely to be deformed by heat when a load is applied to the pressure receiving diaphragm 713 during the welding because it becomes soft due to welding heat. This may lead up to another problem, that is, loads applied to the diaphragms 713 and 723 by the pressure transmitting rod 780 may not be properly set to predetermined values.

Figure 5:
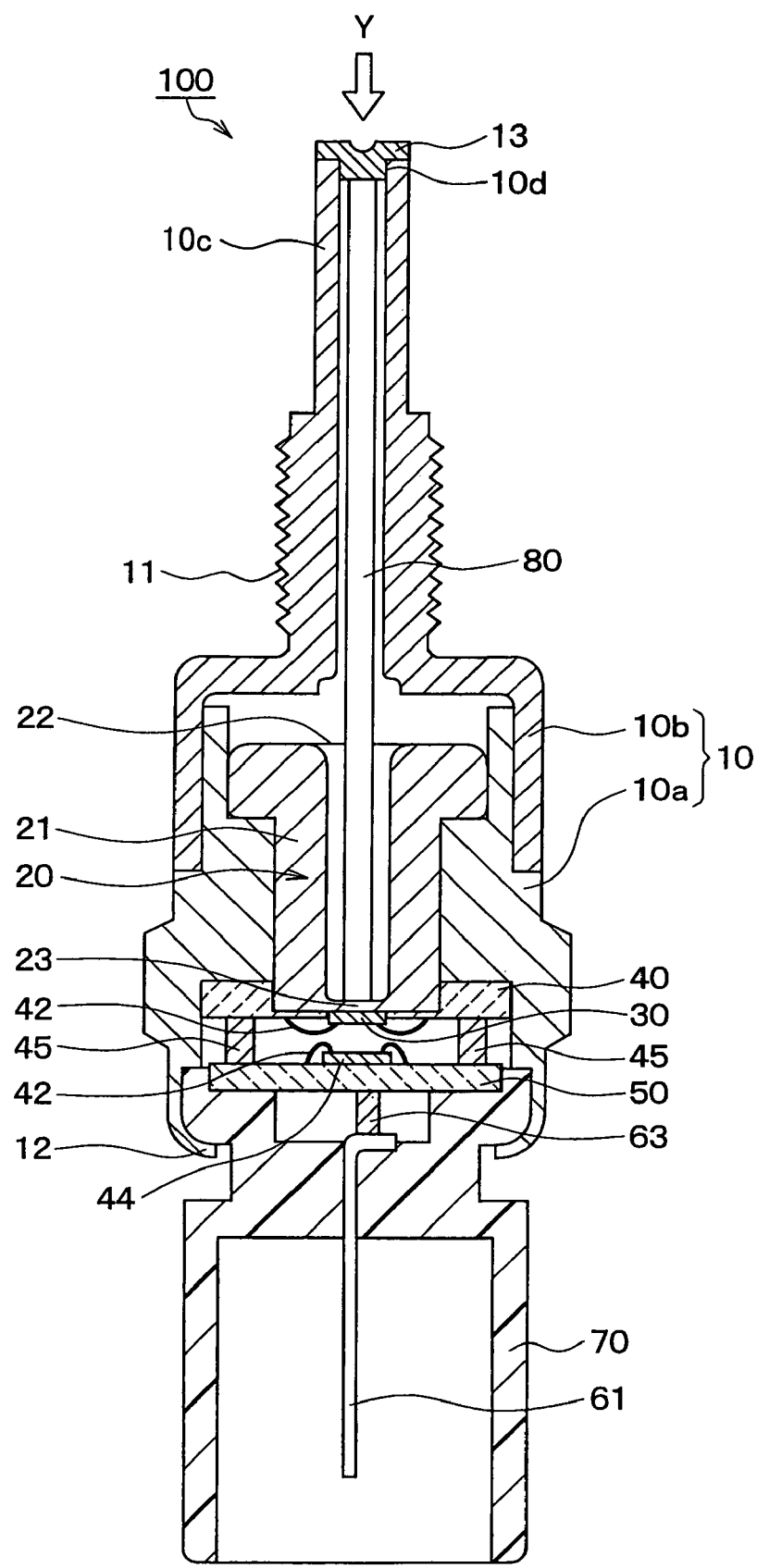
FIG. 5 is a cross-sectional view of a pressure sensor according to the fourth embodiment of the present invention.

An assembly method of the pressure sensor 100 will be explained referring to FIG. 5. The case 10 is formed as one unit by assembling the first case 10a and the second case 10b together. Prior to the assemble of the first case 10a and the second case 10b, the sensing unit 20 is fixed to the first case 10a and the pressure receiving diaphragm 13 is welded to the second case 10b. The first case 10a and the second case 10b are assembled into one unit in which the pressure transmitting rod 80 is housed such that the first end and the second end of the pressure transmitting rod 80 are pressed against the sensing unit 20 and the pressure receiving diaphragm 13, respectively. Namely, the loads are applied to the sensing unit 20 and the pressure receiving diaphragm 13 by the pressure transmitting rod 80 through its first and second ends, respectively.

The pressure receiving diaphragm 13 is welded in advance to the assembling of the first case 10a and the second case 10b. Namely, a process for welding the pressure receiving diaphragm 13 to the case 10 and a process for applying the load to the pressure receiving diaphragm 13 are separately performed. Thus, the pressure receiving diaphragm 13 is thermally stable and no thermal deformation due to the application of the load will occur in the pressure receiving diaphragm 13. In the welding process, the pressure receiving diaphragm 13 is less likely to be thermally deformed due to the load applied to the pressure receiving diaphragm 13.

The first case 10a and the second case 10b are assembled together by press-fitting. The sensing unit 20 is constructed of the metal stem 21 and the strain gage 30. The metal stem 21 has the hollow portion in the center, the opening 22 at its first end, and the diaphragm 23 at the second end. The strain gage 30 is mounted to the surface of the diaphragm 23. With this configuration, pressure in the combustion chamber is properly detected.

The present invention should not be limited to the embodiment previously discussed and shown in the figures, but may be implemented in various ways without departing from the spirit of the invention. For example, the case 10 may be formed in a single piece without assembling multiple parts, such as the first case 10a and the second case 10b. The sensing unit 20 can be configured differently as long as it outputs signals according to the pressure transmitted from the pressure transmitting rod 80. The pressure sensor 100 can be used for sensing pressure other than the pressure in a combustion chamber of an engine.

The first case 10a and the second case 10b can be formed so that they are jointed in the pipe portion 10c. In this case, the metal tem 21 cannot be press-fitted to the case 10 from the pipe portion 10c. Thus, the metal stem 21 may be screwed to the case 10. The first case 10a and the second case 10b may be fixed together by welding or with adhesive or screws.

What is claimed is:

1. A pressure sensor comprising:
   a pressure receiving diaphragm that receives pressure;
   a sensing unit that outputs a signal according to a level of pressure;
   a pressure transmitting rod that transmits the pressure received by the pressure receiving diaphragm to the sensing unit; and
   a case that houses the sensing unit and the pressure transmitting rod, wherein,
   the pressure transmitting rod is arranged inside the case such that a first end thereof sits on a sensing unit side and a second end thereof sits on a pressure receiving diaphragm side, the case has a sensing unit housing portion that houses the sensing unit and a pipe portion that extends from the sensing unit housing portion in a form of a pipe, the pipe portion has a first end located adjacent to the sensing unit housing portion and a second end located away from the sensing unit housing portion, the second end of the pipe portion has an opening, the pipe portion is constructed of an inner pipe and an outer pipe, the inner pipe is arranged inside the outer pipe and fixed to the outer pipe, and the pressure receiving diaphragm is welded to the inner pipe at the second end of the pipe portion such that the pressure receiving diaphragm covers an opening of the inner pipe.

2. The pressure sensor according to claim 1, wherein the inner pipe is fixed to the outer pipe at a position adjacent to the first end of the pipe portion.

3. The pressure sensor according to claim 1, wherein the inner pipe is projected from the outer pipe at the second end of the pipe portion.

4. The pressure sensor according to claim 1, wherein the inner pipe is arranged such that an end thereof is positioned inside the outer pipe at the second end of the pipe portion.

5. The pressure sensor according to claim 4, wherein the pressure receiving diaphragm is welded to the inner pipe at the second end of the pipe portion such that the pressure receiving diaphragm seals the opening of the inner pipe and the an opening of the outer pipe.

6. The pressure sensor according to claim 4, wherein the pressure receiving diaphragm is welded to the inner pipe at the second end of the pipe portion such that the pressure receiving diaphragm seals the opening of the inner pipe.

7. The pressure sensor according to claim 1, wherein:

the pressure transmitting rod is arranged inside the case such that a first end and a second end thereof have contact with the sensing unit and the pressure receiving diaphragm, respectively, and loads are applied to the sensing unit and the pressure receiving diaphragm from the first end and the second end, respectively;

the case is constructed by assembling a first case and a second case into one unit; and the sensing unit is fixed to the first case and the pressure receiving diaphragm is fixed to the second case.

8. The pressure sensor according to claim 7, wherein the first case and the second case are fixed together by press-fitting.

9. The pressure sensor according to claim 1, wherein:

the sensing unit includes a metal stem and a strain gage;

the metal stem has an opening at a first end, a diaphragm at a second end, and a hollow in a middle; and the strain gage is mounted to a surface of the diaphragm.

10. A method for assembling a pressure sensor having a pressure receiving diaphragm, a sensing unit, a pressure transmitting rod, and a case that is constructed of a first case and a second case that includes an outer pipe portion and an inner pipe portion arranged inside of and fixed to the outer pipe portion, the method, comprising:

fixing the sensing unit to the first case;

welding the pressure receiving diaphragm to the inner pipe portion of the second case; and assembling the first case and the second case together such that the pressure transmitting rod is housed in the first and the second cases, and a first end and a second end of the pressure transmitting rod are pressed against the sensing unit and the pressure receiving diaphragm, respectively.

* * * * *